United States Patent [19]

Barry

[11] Patent Number: 4,545,127
[45] Date of Patent: Oct. 8, 1985

[54] POSITIONING SYSTEM FOR EMBROIDERY HOOP

[76] Inventor: Kevin M. Barry, 167 Rolling Acres Rd., Lunenburg, Mass. 01462

[21] Appl. No.: 640,668

[22] Filed: Aug. 14, 1984

[51] Int. Cl.$^4$ .............................................. G01B 5/00
[52] U.S. Cl. ................................................ 33/180 R
[58] Field of Search ................ 33/1 G, 1 AA, 180 R, 33/181 R; 112/80

[56] References Cited

U.S. PATENT DOCUMENTS

| | | | |
|---|---|---|---|
| 2,387,986 | 10/1945 | Evans | 33/180 R |
| 3,057,073 | 10/1962 | Swartz | 33/180 R |
| 3,074,177 | 1/1963 | Duvoisin | 33/180 R |
| 3,500,550 | 3/1970 | Mihai | 33/180 R |
| 3,798,781 | 3/1974 | Wolfe | 33/180 R |
| 3,842,510 | 10/1974 | Elliott | 33/180 R |
| 4,503,618 | 3/1985 | Eberhardt | 33/180 R |

*Primary Examiner*—Richard R. Stearns
*Attorney, Agent, or Firm*—Joseph S. Iandiorio; William E. Noonan

[57] ABSTRACT

A positioning system for locating a keyed embroidery hoop on a workpiece, including a hoop mounting plate; a hoop recess in the mounting plate for receiving a keyed hoop; a center line on the plate; and a plurality of parallel gauge lines for positioning a workpiece on the plate relative to the hoop recess.

34 Claims, 11 Drawing Figures

POSITIONING SYSTEM FOR EMBROIDERY HOOP

FIELD OF INVENTION

This invention relates to an improved positioning system for locating a keyed embroidery hoop on a workpiece.

BACKGROUND OF INVENTION

A practical problem in employing embroidery machines to stitch designs and monograms on garments, bags and other finished and unfinished goods is locating on the workpiece the center of the area in which the embroidery is to be placed and then aligning it properly so that the final embroidered design or monogram is properly oriented. In one approach a garment is first marked with a pin to locate the center of the area to be embroidered and then is placed on a raised mounting plate or hoop jig. The marking requires that the garment be laid out for viewing and measuring before marking. Then after the marking it is transferred to the hoop jig, where the garment must be adjusted until the mark is in the center of the hoop and the garment is properly oriented on the hoop. These hoops used in machines are keyed hoops which only fit in their respective machines one way. Therefore, if the garment is not properly oriented in the hoop the machine will not embroider the design in the right orientation even though it is centered in the chosen area.

Proper orientation is difficult when the garment is obviously symmetrical and the design is to be centered. But there is even greater difficulty when the design is to be placed off-center, e.g. on a breast pocket; or when the garment or other goods are not easily alignable, e.g. a duffel bag. Large garments which can be opened and laid flat, and large flat goods, are difficult to maneuver on a conventional raised hoop jig: the goods flop over the sides and there is no way to gauge their position or align them with respect to the hoop.

Another problem that often arises is the slipping of backing pieces used as a backing to give body to the garment just where the embroidery stitching is to be placed. Typically a backing piece must be taped in position over the hoop between it and the garment to be embroidered. This requires periodically applying fresh tape, which is time consuming and expensive. In addition, when more than one backing piece is required the tape holds only one and allows the other to slip, causing alignment problems.

SUMMARY OF INVENTION

It is therefore an object of this invention to provide an improved positioning system for locating a keyed embroidery hoop on a workpiece.

It is a further object of this invention to provide such a positioning system which simpler, easier and quicker to use.

It is a further object of this invention to provide such a positioning system in which the positioning is more reliable, accurate and repeatable.

It is a further object of this invention to provide such a positioning system which enables easy off-center alignment of the garment.

It is a further object of this invention to provide such a positioning system which enables one or more backing pieces to be held firmly yet removably in position between the hoop and workpiece.

It is a further object of this invention to provide such a positioning system which enables workpieces to be marked and oriented to the hoop in a single operation.

The invention features a positioning system for locating a keyed embroidery hoop on a workpiece. There is a hoop mounting plate and a hoop recess in the mounting plate for receiving a keyed hoop. There is a center line on the plate and a plurality of parallel gauge lines for positioning a workpiece on the plate relative to the hoop recess.

In a preferred embodiment there is at least one registration member extending from the plate. The registration member may be a neck stub, an arm stub, two arm stubs, or a neck stub and two arm stubs.

The recess may be larger than a keyed hoop and include at least one spacer which is receivable in the recess for shifting the position of the keyed hoop in the recess. The center line and the gauge lines may be parallel to one another, they may be vertical or horizontal, or they may be both vertical and horizontal. The mounting plate may be supported by a post above a base plate. There may also be a backing holder for holding at least one piece of backing material to the mounting plate between the hoop and the workpiece. The backing holder may include a holder member which extends across the mounting plate adjacent to the recess. The backing holder may include spring means for urging the holder member against the mounting plate, and there may be a groove in the mounting plate for receiving the holder member. The hoop-receiving recess may be generally centered on the mounting plate or may be proximate one edge of the mounting plate. The mounting plate may have a measuring device along one edge, and there may be means for clamping a workpiece to the mounting plate proximate that measuring device. There may also be a second measuring device at the opposite edge of the mounting plate.

DISCLOSURE OF PREFERRED EMBODIMENT

Other objects, features and advantages will occur from the following description of a preferred embodiment and the accompanying drawings, in which.

Figure 1:
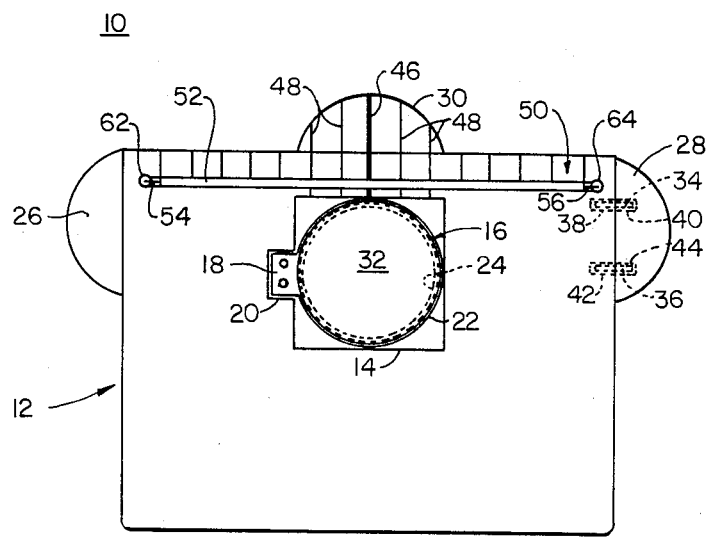
FIG. 1 is a top plan view of a mounting plate for the positioning system according to this invention.

There is shown in FIG. 1 a positioning system 10 for locating a keyed embroidery hoop 16 on a workpiece including a hoop jig or mounting plate 12 having a recess 14 for receiving keyed embroidery hoop 16. The key 18 fits in a conforming recess 20 integral with recess 14 so that the hoop cannot be rotated or moved about in recess 14. Hoop 16 includes a basic outer hoop 22 which is typically metal and has a conventional device, such as a screw and a nut, for tightening the tension on the hoop. There is also an inner hoop 24, shown in phantom, which is snapped into place after the material to be embroidered is laid across the base hoop 22. Inner hoop 24 is typically wood or plastic; outer hoop 22 may also be plastic.

A key 18 is designed to fit into a particular recess in an embroidery machine which embroiders on the material clamped into hoop 16. Key 18, therefore, specifically registers the hoop and the area of the material in it with respect to the embroidery or monogramming to be done by the machine. The particular configuration of the hoop and the key varies with the embroidery machines available from different manufacturers. Mounting plate 12 also includes one or more registration members such as an arm stub 26, arm stub 28, and neck stub 30. These are used to align a garment such as a crew neck sweater so that the neck and arm holes are precisely located on mounting plate 12 to place the portion of the sweater over the breastbone directly in the area 32 of the material held by hoop 16. Stubs 26, 28 and 30 may be permanently attached to mounting plate 12, or they may be removably attached, for example as shown with respect to arm stub 28, which uses a pair of dowels 34, 36 that fit in mating holes 38, 40 and 42, 44. The stubs may also be made adjustable so that they can be slid along the edge of mounting plate 12 if that is desirable. A center line 46 and a plurality of gauge lines 48 which are parallel to center line 46 are embossed, inscribed, painted or otherwise marked on mounting plate 12 to further aid in aligning the sweater in the left-right dimension.

Figure 2:
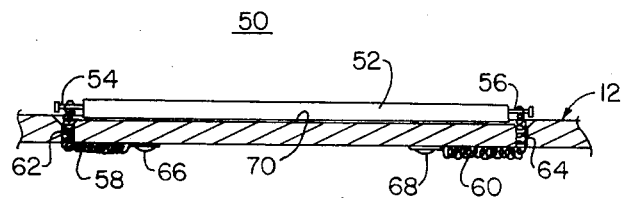
FIG. 2 is an enlarged detailed side elevational view in cross section of a portion of the mounting plate of FIG. 1, showing the backing holder.
Figure 3:
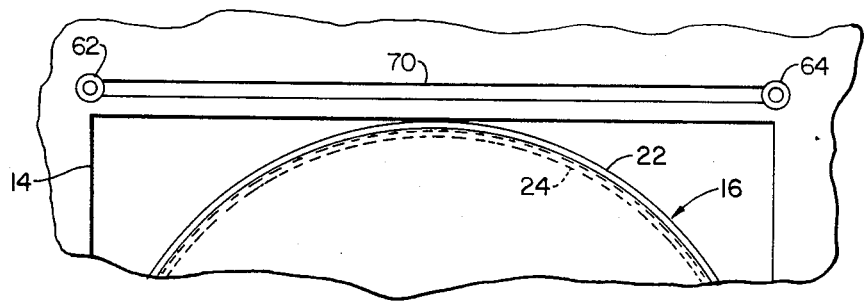
FIG. 3 is an enlarged detailed view of the backing holder shown in FIG. 1 with the springs and bar removed.
Figure 4:
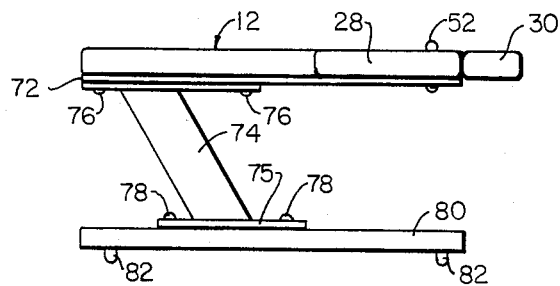
FIG. 4 is a side elevational view of the mounting plate mounted on a post and base plate according to this invention.

A backing holder 50 is provided for holding backing pieces in position over hoop 16 between it and the garment. Backing holder 50 includes a bar 52 having a pin 54, 56, FIG. 2, at each end which engages a spring 58, 60 which passes through hole 62, 64 in mounting plate 12 and is fixed as at pins 66, 68, to the underside of plate 12. Springs 58 and 60 provide a downward force, holding bar 52, against plate 12. Immediately beneath bar 52 extending between holes 62 and 64 is a groove 70, FIG. 3, which receives, or at least partially receives, bar 52 and creates a gripping surface between which the backing material may be crimped by bar 52 under the urging of springs 58 and 60. Mounting plate 12 may be supported on the large upper flange 72, FIG. 4, of post 74, such as by screws 76, and post 74 may be mounted by similar screws through lower flange 75 to base plate 80, which stands on conventional rubber feet 82. Post 74 and flanges 75 and 76 may be integrally formed of plastic or metal, most typically aluminum.

In use, a crewneck sweater is pulled over mounting plate 12 so that the neck of the sweater fits around neck stub 30, and arm stubs 26 and 28 fit in the sleeve holes of the sweater. Usually the sweater will have been marked at the center of area 32 where the embroidery is to be stitched. One or more pieces of backing material are laid over recess 14 and clamped under bar 52. The sweater is then pulled over mounting plate 12 so that the front of the sweater lays over the front of the mounting plate, the neck of the sweater registers with neck stub 30, and the sleeve holes of the sweater register with arm stubs 26 and 28. The back of the sweater is pulled around over mounting plate 72 and as far down as post 74 allows. Then center line 46 and gauging lines 48 are referred to to finally adjust the sweater to a center position, after which inner ring or hoop 24 is pressed downward, pinching the front of the sweater and the backing piece between it and outer hoop 22 and clearly defining the area 32 to be embroidered. Hoop 16, along with the sweater, is then removed from mounting plate 12 and delivered to the embroidery machine for stitching.

Figure 5:
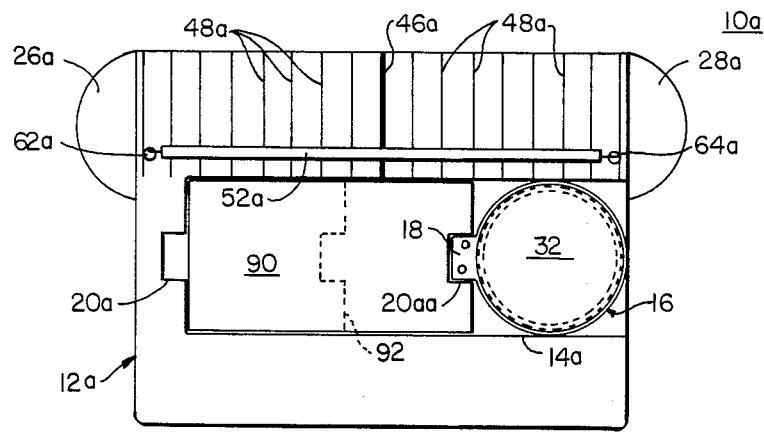
FIG. 5 is a plan view of an alternative construction of a mounting plate according to this invention provided with spacer means for shifting the embroidery hoop.

Embroidering designs or monograms off center on golf shirts, sport shirts, V-neck sweaters and the like requires a mounting plate 12a, FIG. 5, which enables off-center mounting of hoop 16. This is accomplished by using an enlarged recess 14a which extends nearly all the way across mounting plate 12a and by providing a spacer 90 which can be used as shown to position hoop 16 to the far right where key 18a engages key recess 20aa, so that the area 32 of the garment held by hoop 16 is in the area of the left breast of the garment. If it is desired to have the embroidered area 32 over the right breast, then spacer 90 is removed and hoop 16 is moved to the left, where key portion 18 engages key conforming recess 20a. When it is desired to position hoop 16 in the center of mounting plate 12a, then a spacer which is roughly half the size of spacer 90, as indicated by dashed line 92, may be used to position hoop 16 at the center of mounting plate 12a.

Figure 6:
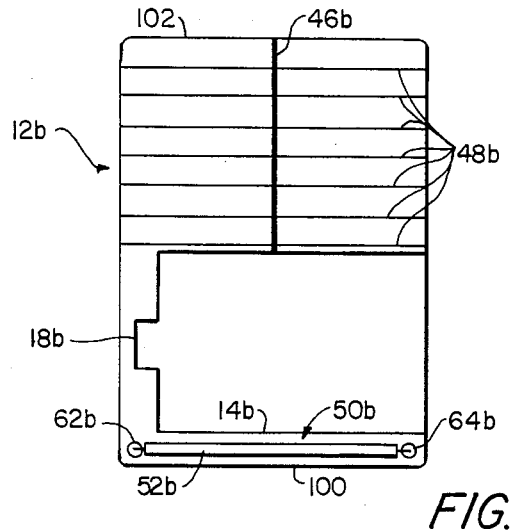
FIG. 6 is a top plan view of a mounting plate according to this invention with the hoop recess proximate the lower edge of the plate.
Figure 7:
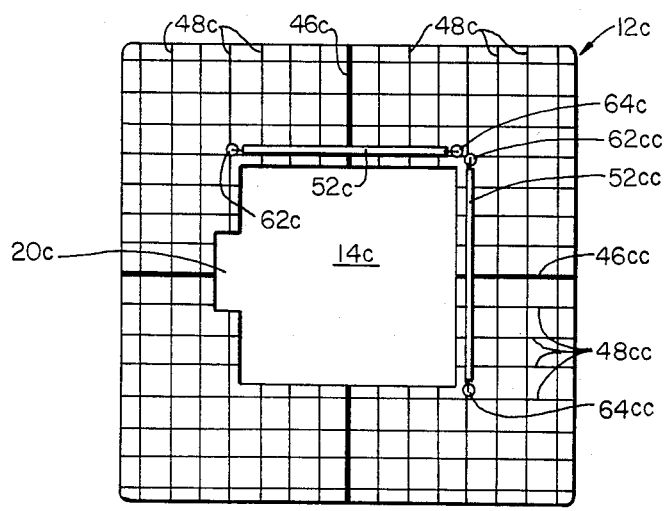
FIG. 7 is a top plan view of a mounting plate according to this invention with the recess centered and surrounded by vertical and horizontal center lines and gauge lines.

When embroidering duffel bags, beach bags, Bermuda bags, or other similar articles, especially of smaller sizes, it is not always possible to mount the open bag on the mounting plate high enough to properly position it over the recess, which is at the middle of the mounting plate, as in FIG. 5, or toward the top of the mounting plate, as shown in FIG. 1. This is so because of the interference of post 74, FIG. 4. Rather than reverse the bag and have it slipped over the top of the mounting plate, which would require inverting the pattern of embroidery done by the machine and would require that the bag be run under the machine supports, where it is cramped and where oil might soil the bag, mounting plate 12b, FIG. 6, has been provided with a recess 14b proximate the lower edge 100. To further facilitate placing the hoop on such items, a plurality of gauge lines 48b perpendicular to center line 46b are provided between recess 14b and the other edge 102 of mounting plate 12b. In this manner the bag may be slid over the bottom edge 100 of mounting plate 12b, up over recess 14b, and as high as a predetermined one of gauge lines 48b. The gauge lines thus provide an absolute definition of the position of the bag and make that position repeatable, bag after bag, for assembly line production, just as do the gauge lines 48 and 48a in FIGS. 1 and 5.

Figure 8:
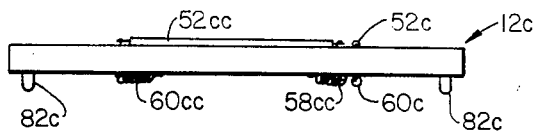
FIG. 8 is a side view of the mounting plate of FIG. 7.

For larger pieces such as jackets, sweaters and shirts that can be opened down the front, towels and flat pieces, and pieces of unfinished goods, mounting plate 12c may be used. Mounting plate 12c includes a longitudinal center line 46c and transverse center line 46cc, accompanied by parallel gauge lines 48c and 48cc, respectively, with a centrally located recess 14c. Mounting plate 12a stands directly on the tabletop on a conventional short rubber feet 82c, FIG. 8. Thus a flat piece of work can be laid directly on mounting plate 12c without the nuisance of the overlapping portions tending to fall or slide off the top of mounting plate 12c. In use, the flat piece is lying on top of mounting plate 12c and is simply aligned with either a horizontal or vertical gauge line, or both, for accurate positioning of the area to be embroidered over recess 14c. Like pieces may be similarly positioned for easy repeatability of the positioning of the embroidery.

For very large workpieces, such as large blankets and the backs of jackets, it is generally necessary to measure them first on a large table to find the center or the particular area in which the embroidery is to be stitched, and then place a mark at the center of that area. Subsequently, the blanket or jacket is moved onto a mounting plate which contains a hoop recess where the hoop is mounted to the workpiece.

Figure 9:
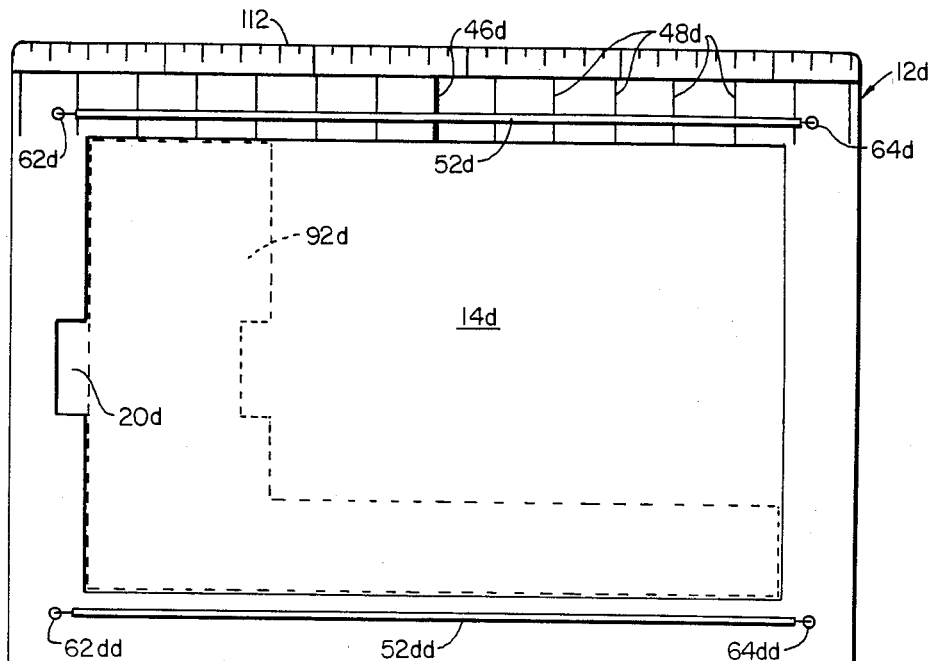
FIG. 9 is a top plan view of another alternative construction of a mounting plate according to this invention employing measuring devices and a workpiece clamp.
Figure 9:
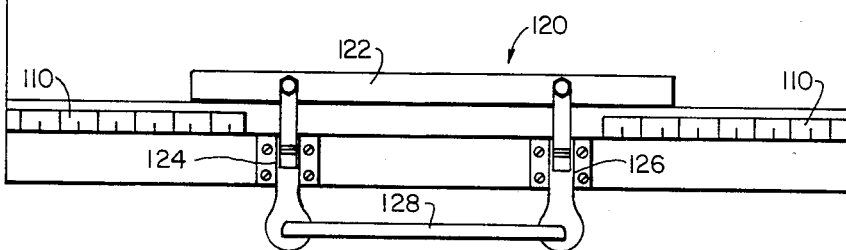
Figure 10:
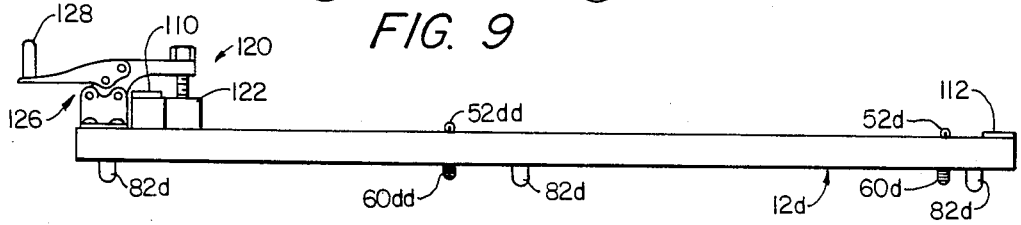
FIG. 10 is a side view of the mounting plate of FIG. 9.

This can now be done in one operation using one mounting plate 12d, FIG. 9, which includes a recess 14d in its central area and a measuring device, such as a ruler or yardstick 110, along at least one edge. A similar measuring device 112 may be provided at the other edge. A center line 46d and gauge lines 48d may be provided as previously. A clamping mechanism 120 is mounted proximate ruler or yardstick 110 and includes a clamping bar 122 fastened to two clamp actuators 124, 126, which are interconnected by handlebar 128. Clamps 124 and 126 are conventional toggle clamps, such as #225-U made by Destaco of Troy, Mich. Mounting plate 12d is also mounted on rubber feet 82d.

The garment is placed over mounting plate 12d and then shifted to the left or right until it is centered, or until the area to be embroidered is centered, in accordance with the measurements provided by yardsticks 110 and/or 112, and/or gauge lines 48d. When properly positioned it need not now be marked for it is already in position on the marking plate. All that need be done is the placement of a hoop in recess 14d and the snapping of the inner ring or hoop into the outer ring to trap the material.

Figure 11:
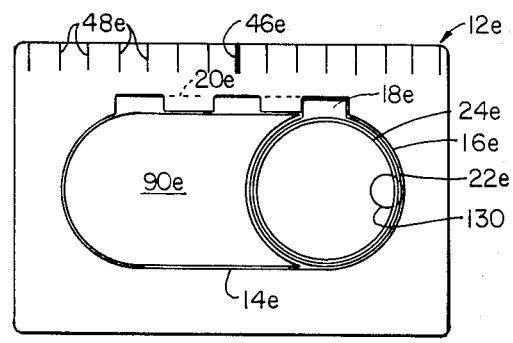
FIG. 11 is a top plan view of a mounting plate for an embroidery hoop of a slightly different configuration according to this invention.

Although thus far the examples of the mounting plates, and specifically the recess in the mounting plates, are shown for receiving one particular form of hoop and key, this is not a necessary limitation of the invention, as various other recesses may be used to accommodate other designs of hoops and keys. The mounting plates described may be provided with various inserts to accommodate other hoops and keys or the mounting plate may be designed for a particular design. For example, mounting plate 12e, FIG. 11, may include a hoop 16e with a much smaller key 18e at the upper side of recess 14e toward center line 46e and gauge lines 48e. Recess 14e may be enlarged as shown and provided with a spacer 90e, which can be removed so that hoop 16e can be slid all the way to the left, or spacer 90e can be removed and replaced with a somewhat narrower spacer, not shown, so that hoop 16e may be placed in the center of recess 14e. A finger hole 130 may be provided in the bottom of recess 14e so that the operator can insert his finger from below to push hoop 16e out of recess 14e.

Other embodiments will occur to those skilled in the art and are within the following claims:

What is claimed is:

1. A positioning system for locating a keyed embroidery hoop on a workpiece comprising: a hoop mounting plate; a hoop recess in said mounting plate shaped for receiving a keyed hoop and positioning said hoop in a predetermined orientation; a center line on said plate; and a plurality of parallel gauge lines for positioning a workpiece on said plate relative to said hoop recess.

2. The positioning system of claim 1 further including at least one registration member extending from said plate.

3. The positioning system of claim 2 in which said registration member is a neck stub.

4. The positioning system of claim 2 in which said registration member is a arm stub.

5. The positioning system of claim 2 in which there are two registration members which are arm stubs.

6. The positioning system of claim 2 in which there are three registration members including two arm stubs and a neck stub.

7. The positioning system of claim 1 in which said recess is larger than a keyed hoop and further including at least one spacer receivable in said recess for shifting the position of a keyed hoop in said recess.

8. The positioning system of claim 1 in which said center line and gauge lines are vertical.

9. The positioning system of claim 1 in which said center line and gauge lines are horizontal.

10. The positioning system of claim 1 in which there are vertical and horizontal center lines and gauge lines.

11. The positioning system of claim 1 further including a base plate and at least one post for supporting said mounting plate spaced above said base plate.

12. The positioning system of claim 1 further including a backing holder for holding at least one piece of backing material to said mounting plate between said hoop and workpiece.

13. The positioning system of claim 12 in which said backing holder includes a holder member extending across said mounting plate adjacent said recess.

14. The positioning system of claim 13 in which said backing holder includes spring means for urging said holder member against said mounting plate.

15. The positioning system of claim 14 in which said backing holder includes a groove in said mounting plate for receiving said holder member.

16. The positioning system of claim 1 in which said recess is generally centered on said mounting plate.

17. The positioning system of claim 1 in which said recess is proximate one edge of said mounting plate.

18. The positioning system of claim 1 further including a measuring device on one edge of said mounting plate.

19. The positioning system of claim 18 further including means for clamping a workpiece to said mounting plate proximate said measuring device.

20. The positioning system of claim 18 further including a second measuring device at the opposite edge of said mounting plate.

21. A positioning system for locating a keyed embroidery hoop on a workpiece comprising: a hoop mounting plate; a hoop recess in said mounting plate shaped for receiving a keyed hoop and positioning said hoop in a predetermined orientation; and at least one registration member extending from said plate.

22. The positioning system of claim 21 in which said registration member is a neck stub.

23. The positioning system of claim 21 in which said registration member is a arm stub.

24. The positioning system of claim 21 in which there are two registration members which are arm stubs.

25. The positioning system of claim 21 in which there are three registration members including two arm stubs and a neck stub.

26. A positioning system for locating a keyed embroidery hoop on a workpiece comprising: a hoop mounting plate; a hoop recess in said mounting plate shaped for receiving a keyed hoop and positioning said hoop in a predetermined orientation; and a center line on said plate; said recess being larger than a keyed hoop and further including at least one spacer receivable in said recess for shifting the position of a keyed hoop in said recess.

27. The positioning system for claim 26 further including a plurality of parallel gauge lines for positioning a workpiece on said plate relative to said hoop recess.

28. A positioning system for locating a keyed embroidery hoop on a workpiece comprising: a hoop mounting plate; a hoop recess in said mounting plate shaped for receiving a keyed hoop and positioning said hoop in a predetermined orientation; a center line on said plate; and a backing holder for holding at least one piece of backing material to said mounting plate between said hoop and workpiece.

29. The positioning system of claim 28 in which said backing holder includes a holder member extending across said mounting plate adjacent said recess.

30. The positioning system of claim 29 in which said backing holder includes spring means for urging said holder member against said mounting plate.

31. The positioning system of claim 30 in which said backing holder includes a groove in said mounting plate for receiving said holder member.

32. A positioning system for locating a keyed embroidery hoop on a workpiece comprising: a hoop mounting plate; a hoop recess in said mounting plate shaped for receiving a keyed hoop and positioning said hoop in a predetermined orientation; and a center line on said plate; said recess being proximate one edge of said mounting plate, a center line extending from said recess to the opposite edge of said mounting plate, and a plurality of gauge lines between said recess and said opposite edge and perpendicular to said center line.

33. A positioning system for locating a keyed embroidery hoop on a workpiece comprising: a hoop mounting plate; a hoop recess in said mounting plate shaped for receiving a keyed hoop and positioning said hoop in a predetermined orientation; a center line on said plate; said recess being generally centrally disposed in said mounting plate; and a longitudinal center line, a transverse center line and a plurality of longitudinal and transverse gauge lines parallel with each of said center lines, respectively.

34. A positioning system for locating a keyed embroidery hoop on a workpiece comprising: a hoop mounting plate; a hoop recess in said mounting plate shaped for receiving a keyed hoop and positioning said hoop in a predetermined orientation; a center line on said plate; a measuring device along one edge of said plate; and means for clamping a workpiece to said mounting plate proximate said measuring device.

* * * * *